United States Patent [19]

Perkins

[11] Patent Number: 4,508,024
[45] Date of Patent: Apr. 2, 1985

[54] INDOOR-OUTDOOR CONVERTIBLE COOKER

[76] Inventor: Gary M. Perkins, 3196 Boeing Rd., Cameron Park, Calif. 95682

[21] Appl. No.: 597,906

[22] Filed: Apr. 9, 1984

[51] Int. Cl.³ ............................................. A47J 37/07
[52] U.S. Cl. ....................................... 99/340; 99/445; 99/446; 99/447; 126/27; 126/275 R
[58] Field of Search ................. 99/340, 401, 407, 444, 99/400, 339, 445, 446; 126/27, 160, 215, 275 R; 426/523

[56] References Cited

U.S. PATENT DOCUMENTS

| | | | |
|---|---|---|---|
| 2,940,381 | 6/1960 | Cottongim | 99/445 |
| 3,301,172 | 1/1967 | Haro | 99/401 X |
| 3,422,746 | 1/1969 | Sheinker | 99/446 X |
| 4,454,805 | 6/1984 | Matthews | 99/400 |

FOREIGN PATENT DOCUMENTS

| | | | |
|---|---|---|---|
| 850663 | 9/1952 | Fed. Rep. of Germany | 99/447 |
| 533383 | 2/1941 | United Kingdom | 99/447 |

*Primary Examiner*—Billy J. Wilhite
*Attorney, Agent, or Firm*—Lothrop & West

[57] ABSTRACT

For barbequeing food, a portable cooker, convertible for both indoor and outdoor use, is provided. The burner of a gas or electric kitchen stove is used to fire the cooker indoors, whereas charcoal or other combustible fuel is used as a source of heat for outdoor use. Two embodiments of the version are disclosed, one adapted for single burner indoor use and the other adapted for twin or dual burner indoor use. The second embodiment employs internal baffles for equal distribution of the applied heat. Both embodiments include an effective grease collection system for intercepting and drawing off a portion of the grease drippings.

10 Claims, 7 Drawing Figures

INDOOR-OUTDOOR CONVERTIBLE COOKER

BACKGROUND OF THE INVENTION a. Field of the Invention

The invention relates generally to barbeque or brazier-style cookers for use either indoors or outdoors for cooking meats, chicken, fish, fowl or vegetables.

More specifically, the invention is directed towards a convertible cooker which is capable of cooking barbeque style both indoors, using a conventional kitchen stove as a heating source, and outdoors, using charcoal or other combustible material as a heating source.

b. Description of the Prior Art

The art of barbeque cooking relies upon both radiant and convective cooking. Food is placed on a grill positioned above a grate which supports hot coals or heated lava rocks. Heat flows upwardly, and by convection and radiation, cooks the meat or food. Grease from the food then drips upon the source of heat, and as the grease sears and burns, the fumes spiral upwardly to the meat to impart the unique barbeque taste.

The most basic and popular outdoor cookers are designed to use a combustible material, such as charcoal, as a source of heat. Charcoal produces noxious fumes which present a serious health hazard if allowed to concentrate in a confined area. In addition, the combustion process leaves a somewhat messy ash deposit within the cooker that is often difficult completely to contain. Consequently, outdoor cookers which are limited solely to the use of such combustible materials as a source of heat, are not well suited for indoor use.

Virtually all indoor barbeque cookers retain the previously mentioned grill and grate shelf arrangement, but supplant the charcoal or combustive material with lava rock or other suitable heat retentive material. The lava rock, heated from below either by an electric or a gas burner, cooks the food in much the same manner as the burning charcoal, but without the production of noxious fumes and ash residue. And, while some smoke is generated during the barbequing process, an exhaust fan or vent overlying the stove or cooking area quickly removes the smoke for discharge outdoors.

While known prior art and the market place are not lacking in portable barbeque units of varying design, these units are not readily convertible for both indoor and outdoor use. Portable barbeque units are generally usable only with charcoal as a heating source, and are thus restricted solely to outdoor applications. Most indoor units, which rely on electric power or gas fuel as a heating source, are permanent, fixed-location units not adaptable for portable, outdoor use. A few portable gas or electric powered barbeques are available, but none of these is flexibly adapted to use either charcoal or a stove top burner as alternative sources of heat.

SUMMARY OF THE INVENTION

The indoor and outdoor convertible cooker described herein contemplates a portable barbeque equally well suited for indoor use upon a kitchen stove or for outdoor use independently fired by charcoal, or the like. Two embodiments of the invention are disclosed, both of which employ a removable top cover and a removable base cover, together with adjustable upper and lower ventilation controls, and a grease collection system.

For indoor use, the bottom of the cooker is left uncovered and the cooking container is placed directly over a stove burner, allowing continuous heating of a layer of heat retentive lava rock located within the lower portion of the cooking container. During outdoor use, a securely fitting base cover is placed over the open bottom of the cooking container, and the lava rock is replaced with a bed of charcoal, or other combustible material.

Another feature of the invention includes an effective system for intercepting and drawing off a portion of the grease drippings. The upper cooking grill is formed from an array of elongated parallel bars, each bar having a coextensive channel within its upper surface. The grill is maintained at a sufficient inclination and in an appropriate direction to allow grease drippings to flow toward a collection trough underlying the lower ends of the bars. The collection trough is also inclined to meet an exhaust spout, directing the collected grease outwardly through the wall of the cooker. There, the grease falls into a receptacle, removable for disposal as necessary. The grease collection system is particularly useful for indoor cooking, where an excessive amount of grease falling on the heated lava rocks may continue downwardly, contaminating and possibly rendering inoperable, the stove burner. The grease collection system also reduces the chances of grease fires erupting within the cooking container.

The first version, or embodiment of the invention resembles a kettle in configuration, and includes a dome-shaped removable cover. This kettle cooker, when used indoors, is designed to be placed over and operate in conjunction with a single burner of a kitchen range, or stove.

The second, or alternative embodiment is elongated in plan, and with its cover removed, resembles the well-known "hibachi" barbeque cooker in external appearance. The main body or container of this cooker has an open bottom of a shape and size preferably to enclose or encompass at least two stove-top burners.

When the second embodiment of the invention is used indoors over two such burners, the layer of lava rock must be heated by two discrete and physically separated sources of heat. To overcome the problems associated with uneven heating of the lava rocks, angularly disposed baffle plates are positioned between the stove top burners and the grate supporting the layer of rocks. The baffle plates direct the heat produced by each burner inwardly and upwardly, toward the lower, central portion of the lava rocks. Thus, the use of such baffle plates ensures that the upwelling heat is uniformly spread beneath the entire bed of lava rocks.

In addition to providing greater flexibility in use and improved performance in operation than barbeques known heretofore, both versions of the invention are relatively simple and economical to construct. Specific details of construction and operation of the invention will become readily apparent from an examination of the drawings and a reading of the detailed description to follow. The novel features that are characteristic of the invention are set forth with particularity in the appended claims.

BRIEF DESCRIPTION OF THE DRAWING FIGURES

Figure 6:
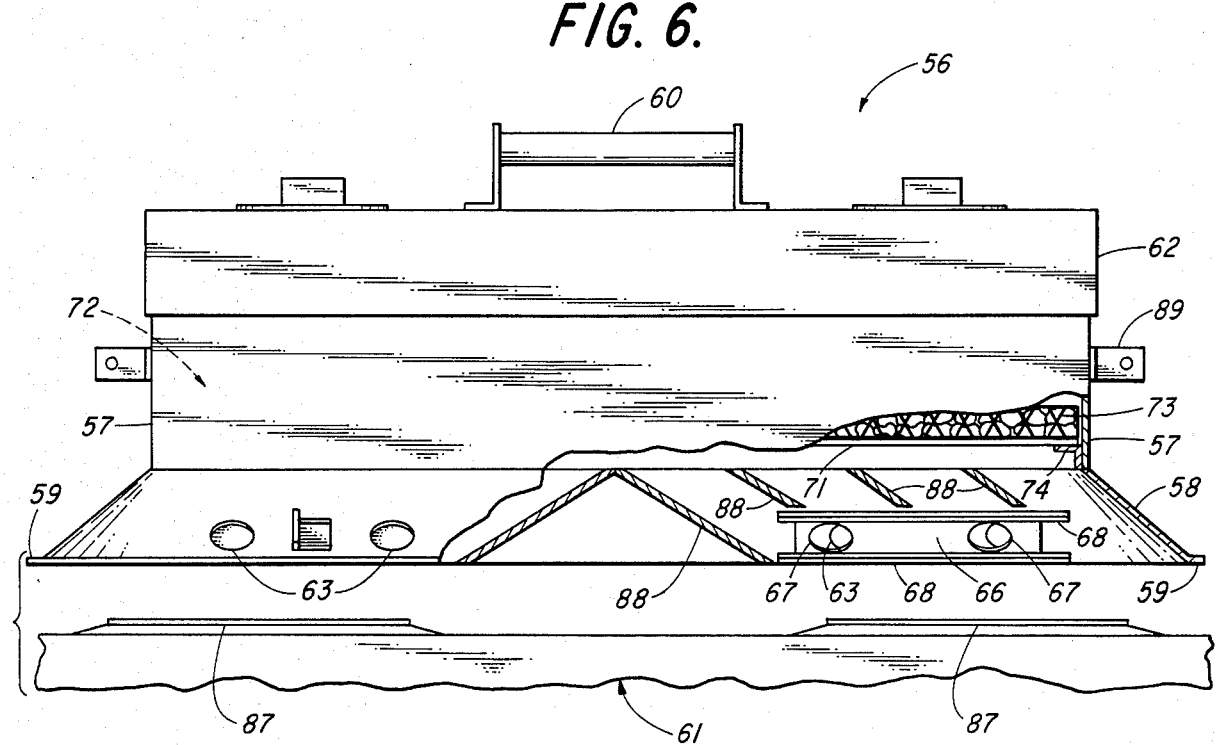
Figure 7:
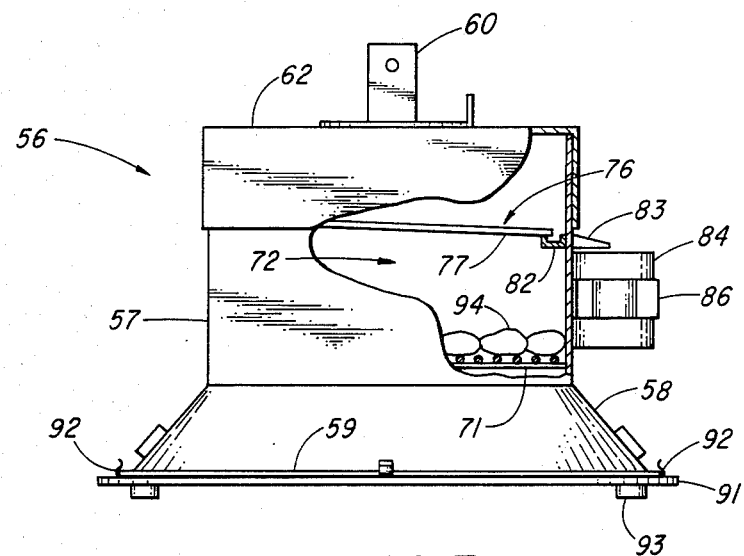

FIG. 6 is a side elevational view of the alternative embodiment, shown slightly elevated above the two burners of the stove, a portion of the walled container being broken away to depict the heat baffle assembly; and, FIG. 7 is an end elevational view of the alternative embodiment converted for outdoor use, the end wall of the container being broken away to reveal the inclined grill and further components of the grease collection system.

DETAILED DESCRIPTION OF THE PREFERRED EMBODIMENT

Figure 1:
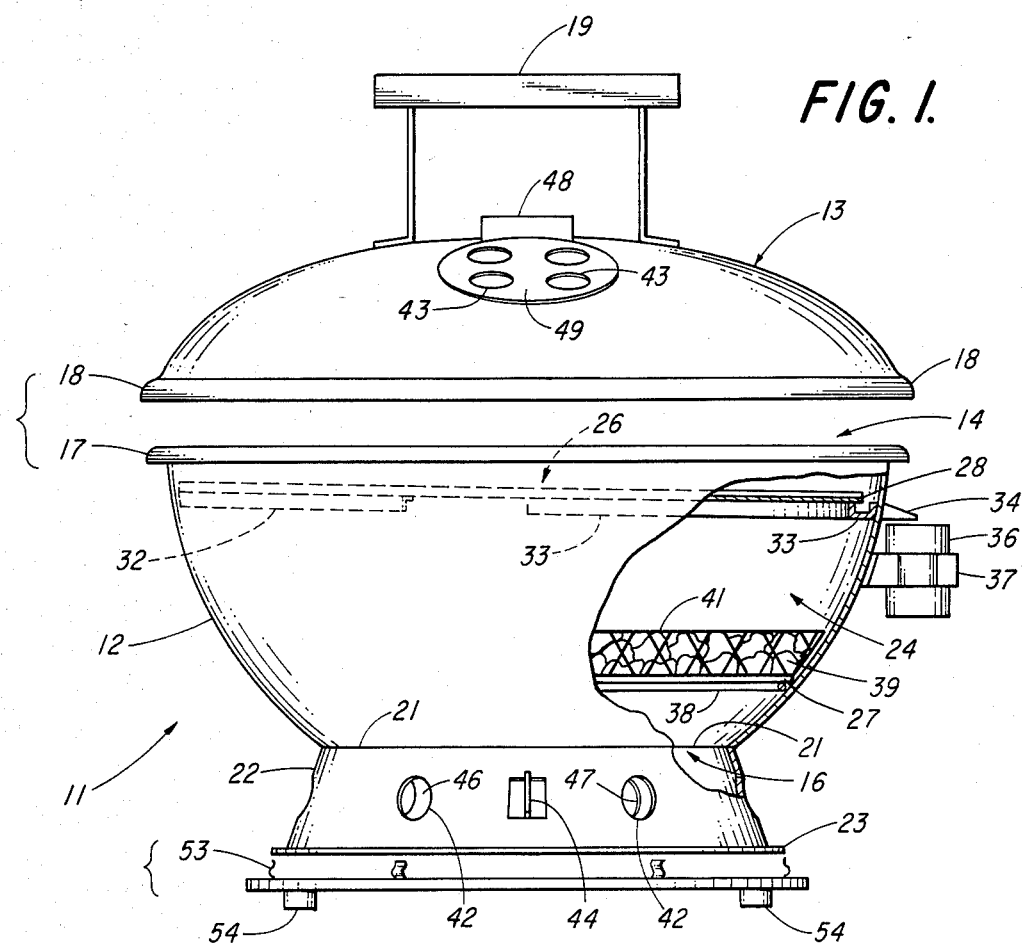
FIG. 1 is a front elevational view of the kettle version of the invention, the top cover and base cover being shown slightly disengaged from their respective mating surfaces upon the cooker, and a portion of the walled container being broken away to reveal inner construction details.
Figure 2:
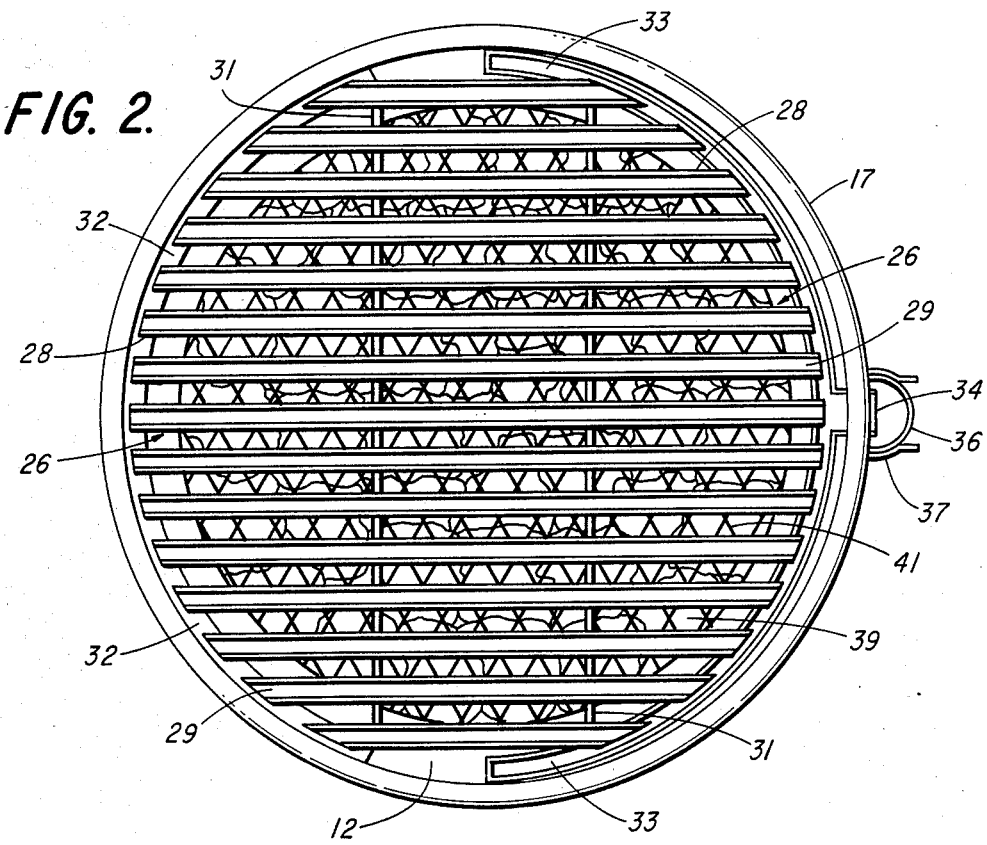
FIG. 2 is a top plan view of the kettle cooker with the top cover removed.
Figure 3:
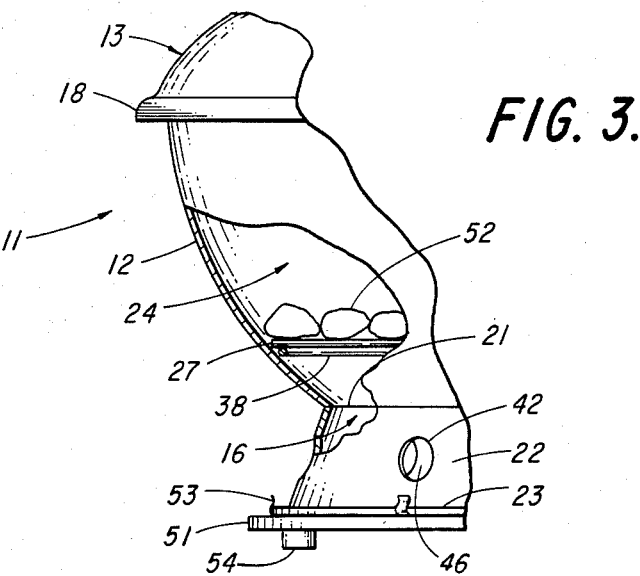
FIG. 3 is a fragmentary front elevational view of the kettle cooker converted for outdoor use, a portion of the walled container being broken away to show the bed of charcoal, therein.

The structure and functional aspects of the kettle version of the cooker are depicted in FIGS. 1, 2, and 3. The invention 11 generally includes a kettle-shaped walled container 12 and a dome-configured, top cover 13. The container 12 is provided with an open top 14, and an open bottom 16. An outwardly rolled rim 17 extends around the periphery of the open top 14, and a similarly configured, but slightly larger curved lip 18 defines the lower edge of the top cover 13. Accordingly, the cover 13 provides a snug and secure fit when placed over the container 12 to enclose the open top 14, as shown in FIG. 3. To faciliate placement and removal of the cover 13, an insulated handle 19 is attached to the top and central portion thereof for grasping.

The periphery of the open bottom 16 is defined by a lower edge 21, terminating the lower wall portion of the container 12. As will become more apparent herein, the open bottom 16 must be sized and configured to cover at least a portion of a stove burner to ensure that the invention, converted for indoor use, will intercept a sufficient amount of heat to cook foods effectively. Ideally, however, the entire stove burner is surrounded and enclosed by a containment wall so that all of the heat produced thereby can be utilized efficiently by the invention. To that end, a frusto-conical base 22 is attached to the lower portion of the container 12, preferably along a smooth interface with the lower edge 21. The hollow base 22 has an open top and an open bottom for unimpeded passage of heat therethrough. The lower edge of the base 22 includes a peripheral annular ring 23, being of sufficient size and of appropriate shape completely to surround the stove burner element. Accordingly, when the invention 11 is converted or adapted for use indoors, the base 22 is merely placed over a selected stove burner and the cooker is ready for use.

The walls of the container 12 define a cooking chamber 24, having a cooking grill 26 disposed within its upper portion, and a heating grate 27 disposed within its lower portion. The grill 26 is constructed from a plurality of elongated grill elements 28, and each element 28 has a coextensive elongated channel 29 in its upper surface (see FIG. 2). The elements 28 are horizontally spaced and parallel with respect to each other, and the resulting planar array is maintained in rigid alignment by a pair of transverse support bars 31.

The grill 26 is supported in inclined relation about an axis transverse to the longitudinal dimension of the elements 28, as shown most clearly in FIG. 1. The upper end of the grill 26 rests upon a bracket 32, semi-circular in plan. The bracket 32 resembles an inverted L in cross section, having its vertical portion attached to the inner wall of the container 12, and its horizontal portion extending inwardly therefrom to support the grill 26.

The lower end of the grill 26 overlies an inclined grease collection trough 33, also semi-circular in plan and conveniently attached to the inner wall of the container 12. The lowermost, middle portion of the trough 33 includes a spout 34, extending outwardly to protrude through the container wall. Beneath the outer extremity of the spout 34 lies a removable grease receptacle 36, supported by a resilient spring metal bracket 37.

The heating grate 27 is supported substantially in horizontal relation by means of an annular rib 38, or rod, affixed to the container wall as shown in FIG. 1. The grate 27 is of conventional construction, preferably employing a plurality of rods or small bars arranged to present a planar supportive surface. The grate rods are rigidly interconnected by other metal pieces, and are spaced from each other to make the heating grate 27 largely perforate.

For indoor cooking, a layer of incombustible, heat retentive material is loosely arranged within the cooking chamber 24, overlying and supported by the heating grate 27. For purposes of the present invention, it has been determined that individual pieces of lava rock 39 surrounded and confined by a cage 41, constructed of wire mesh material, or the like, perform very well. Lava rock, in addition to having heat retentive characteristics, is a relatively porous material, and is therefore capable of absorbing and retaining a considerable amount of the grease drippings falling thereon. Use of this material is particularly advantageous in the present application, for if large amounts of grease were allowed to reach the stove burner element, fire or damage to the element itself might occur.

While selective control of the stove burner element determines the amount of heat entering the cooking chamber 24, it is also desirable to provide a ventilation path through the invention 11 to control the rate of cooking, the amount of smoke exhausted, and the percentage of moisture within the chamber itself. To that end, intake vents 42 and exhaust ports 43 are provided for selective control of air passing through the invention 11.

The intake vents 42 are made selectively adjustable through lateral, or side-to-side movement of a tab 44, attached to an inner vent ring 46. Coincident vents 47 are provided along the ring 46 so that lateral movement of the tab 44 will expose more or less of the coincident vents 47, thereby adjusting the effective size of the vents 42.

The exhaust ports 43 are similarly adjusted by grasping the ear 48, extending from the rotatable disc 49, and establishing the extent to which the ports 43 are aligned with the underlying holes (not shown) in the cover 13.

In operation indoors, the invention 11 is placed over a burner element on a conventional gas or electric kitchen stove. The food to be barbequed is placed upon the grill 26, the cover 13 is normally placed over the container 12, and the vents 42 and ports 43 may be pre-set for the desired degree of ventilation. As the burner heats the lava rock 39 by convective and radiant heat, the rocks absorb and re-radiate heat to warm the cooking chamber 24.

As the food cooks, grease drippings, produced especially by meat products, drop upon the hot lava rocks 39. The grease sears and burns, sending smoke upwardly to impart a barbeque flavor to the meat. A portion of the grease, say thirty percent (30%), is intercepted by the channels 29 within the upper surface of each grill element 28. By gravity, the grease flows down the channels 29 to the inclined trough 33. At the low, mid-point of the trough 33, the grease flows outwardly over the spout 34 and into the receptacle 36, from which it is disposed from time to time. The purpose of the grease collection system, then, is to divert only a portion of the grease drippings, still allowing a sufficient amount to fall upon the underlying lava rocks or charcoal, to impart a barbeque flavor to the meat. However, by intercepting a portion of the drippings, the likelihood of damage caused by a grease fire or the fouling of a burner element is reduced; and, excessive smoke, particularly a problem with indoor cooking, is similarly reduced.

By the simple addition of a base cover 51, and by replacing the caged lava rocks 39 with charcoal 52, or another suitable combustible material, the invention 11 is quickly converted for outdoor use. The cover 51 is secured to the base 22 by means of a plurality of spring clips 53, uniformly spaced about the cover's perimeter. The spring clips 53 are manufactured from a resilient material, so that without damage, they will readily bend outwardly and return spring inwardly, to engage and secure the outer edge of the annular ring 23. FIG. 1 shows the base cover 51 and clips 53 disengaged from the invention 11, while FIG. 3 shows the cover 51 in locking engagement with the ring 23, fully enclosing the open bottom 16. It should also be noted that feet 54 are attached to the underside of the cover 51 to provide a secure footing for the cooker, and to space the cover 51 from any combustible surface upon which it might be placed.

Figure 4:
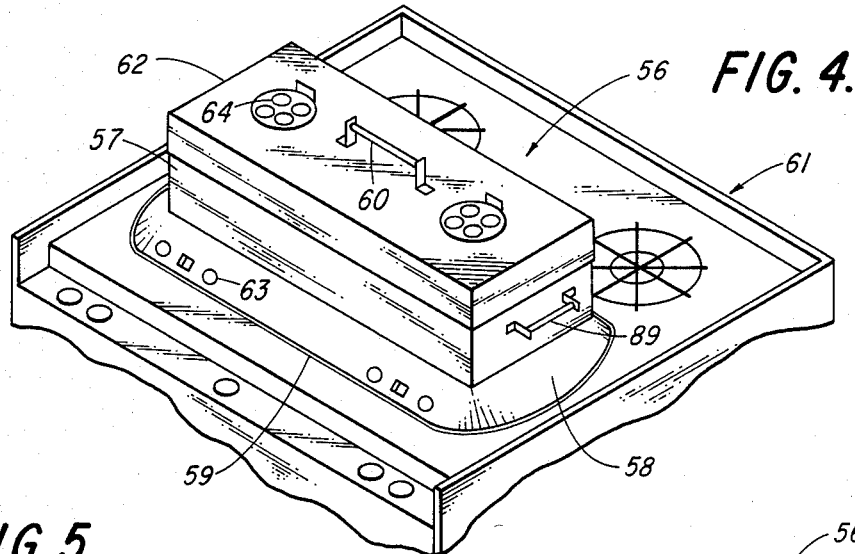
FIG. 4 is a simplified perspective view of the elongated, alternative embodiment of the invention, converted for indoor use and in operative position overlying two burners of a kitchen stove.

An alternative, or second version 56 of the invention is disclosed in FIGS. 4, 5, 6, and 7. The second version 56 is formed from a vertically walled box 57, or container, elongate in plan and having an open top and open bottom. A downwardly and outwardly flaring base 58 is attached to and extends from the lower edge of the box 57. As is shown most clearly in FIGS. 5 and 6, a horizontal lip 59 defines the periphery of the base 58. The size and configuration of the area encompassed by the lip 59 is such that the alternative embodiment 56 is placed over, completely to surround, two stove burners. FIG. 4 shows the embodiment 56 converted for indoor use, and in operative position over two burners of a stove 61.

A removable cover 62 is constructed so as to be slightly larger than, but similarly configured in plan to the container 57. A convenient handle 60 is attached to the centrol portion of the cover's upper surface, allowing easy removal and placement of the cover 62. As is evident, especially in FIG. 7, the cover 62 rests upon the upper edge of the box 57.

A selectable amount of ventilation through the second version of the cooker is provided by the intake vents 63 in the wall of the base 58, and the exhausted ports 64 in the top of the cover 62. The general construction and operation of these vents and ports have been discussed previously. However, for purposes of clarity, specific aspects of the construction of a single intake vent assembly are shown in FIG. 6. The intake vent assembly on the far, or rear wall of the base 58 shows an elongated plate 66, having a pair of apertures 67 therein. The plate 66 slidably engages a pair of guide rails 68, providing a selective degree of registry between the vents 63 and the apertures 67.

Figure 5:
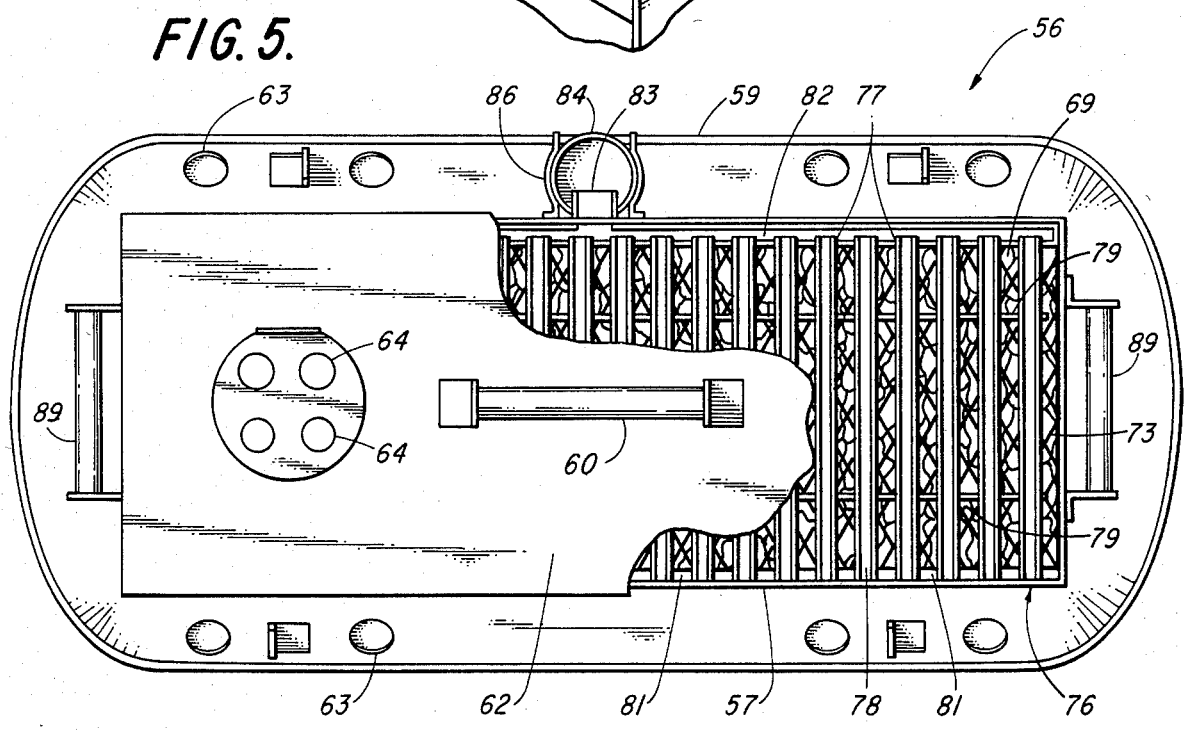
FIG. 5 is a top plan view of the elongated version, a portion of the top cover being broken away to illustrate the construction of the grill and the grease collection system.

Making particular reference now to FIGS. 5 and 6, the cooker is shown converted for indoor use, with a layer of lava rock 69 resting upon the heating grate 71, within the lower portion of the cooking chamber 72. As described previously, the lava rock 69 is preferably confined by a cage of wire mesh 73 to facilitate placement, removal, and storage of the rock layer. Brackets 74 are attached to the two opposite transverse walls of the box 57, and support the grate 71.

A cooking grill 76 is constructed from a plurality of elongated bars 77 having a coextensive channel 78 disposed within the upper surface, thereof. The bars 77 are spaced and maintained in parallel relation by a pair of transverse rods 79.

The grill 76 is positioned within the upper portion of the cooking chamber 72, and is maintained in inclined relation about an axis transverse to the longitudinal axes of the bars 77. The upper end of grill 76 is supported by a ledge 81, extending from the inner wall of the box 57. The lower end of the grill 76 is supported by an elongated collection trough 82, attached to the opposite inner wall of the box 57. As shown in FIG. 7, the grill 76 is inclined downwardly from the front to the rear of the box 57, and the lower ends of the bars 77 are immediately over the collection trough 82. The ends of the collection trough 82 are closed, whereas the middle portion thereof includes a spout 83 extending rearwardly and outwardly through the wall of the box 57. A grease can 84 and associated bracket 86 serve to catch grease collected by the bar and trough assembly and delivered through the spout 83.

Since the second version 56 of the invention is designed for indoor use especially over two stove burner elements, a heat distribution problem is encountered that is not present for the earlier described kettle cooker. The two burners represent point sources of heat which are significantly spaced a considerable distance from each other. To ensure that the layer of lava rocks 69 is evenly heated by the two burner elements 87, a plurality of baffle plates 88 is provided within the base 58 (see FIG. 6). The baffle plates 88 transversely span the elongate walls of the base 58, and the plates are upwardly and inwardly directed toward the center portion of the heating grate 71.

If outdoor use is contemplated, side handles 89 are grasped, and the cooker is carried outdoors for conversion to such use. The grill 76 is removed, as well as the layer of lava rock 69. A base cover 91 is then snapped and held in place by a plurality of spring clips 92 much in the manner as outlined previously. Feet 93 support the partially assembled cooker above the underlying surface.

Charcoal 94 is then placed in a layer over the heating grate 72 and ignited before the cooking grill 76 is set into place for cooking to begin. In all other significant aspects, the kettle version and the elongated, two burner version of the invention are identical in operation, so those details need not be repeated.

Although only a few embodiments of the present invention have been described, other embodiments and variations will occur to those skilled in the art. Many structural changes are possible and those changes are intended to be within the scope of this disclosure. For example, the removable bottom base of the elongated grill cooker might be hinged or latched at one end and swing open for cleaning or indoor use. Therefore, it is also to be understood that the foregoing drawings and specifications merely illustrate and describe the preferred embodiments of the invention and that other embodiments are contemplated within the scope of the appended claims.

I claim:

1. A convertible cooking apparatus, using a combustible material as a source of heat for outdoor cooking and a stove burner element as a source of heat adaptable for heating heat retentive material for indoor cooking, comprising:
   a. a walled container defining a cooking chamber, said container having an open top defined by an upper edge and an open bottom defined by a lower edge, said lower edge being adapted to surround at least a portion of the stove burner element;
   b. a cooking grill disposed within the upper portion of said cooking chamber;
   c. a heating grate disposed within the lower portion of said cooking chamber, said heating grate being adapted to support the combustible material during outdoor cooking and to support a layer of heat retentive material during indoor cooking;
   d. a removable top cover having a lower edge conforming to said upper edge of said container; and,
   e. a removable base cover, attached to the lower edge of said container and enclosing said open bottom during outdoor cooking, said base cover being detached from said lower edge during indoor cooking.

2. An apparatus as in claim 1 including at least one selectively adjustable exhaust port in the wall of said removable top cover, and further including at least one selectively adjustable intake vent in the wall of said container adjacent the bottom portion, thereof.

3. An apparatus as in claim 2 including a plurality of said exhaust ports and a plurality of said intake vents.

4. An apparatus as in claim 1 in which said layer of heat retentive material comprises a plurality of individual pieces of lava rock, surrounded and confined by a wire cage.

5. An apparatus as in claim 1 in which said walled container is formed in the shape of a kettle, said upper edge thereof being circular in configuration, and including a frusto-conical base attached to said container and encircling said open bottom, the lower edge of said base being of sufficient size and of appropriate shape to surround the stove burner element.

6. An apparatus as in claim 5 including at least one selectively adjustable port in the wall of said removable top cover, and further including at least one selectively adjustable intake vent in the wall of said base ring.

7. An apparatus as in claim 1 in which said walled container is elongated in plan and including a downwardly and outwardly flaring base, the upper edge of said base being joined to said open bottom and the lower edge of said base being adapted to surround two stove burner elements.

8. An apparatus as in claim 7 including baffle means located within said base for directing and evenly distributing the heat produced by the burner elements across the underside of said heating grate.

9. An apparatus as in claim 8 in which said base is elongate in plan, and in which said baffle means comprises a plurality of baffle plates transversely spanning the elongated walls of said base, said baffle plates being upwardly and inwardly directed toward the center portion of said heating grate.

10. An apparatus as in claim 1 in which said cooking grill includes: a plurality of elongated grill elements, each of said elements having a coextensive elongated channel in the upper surface thereof, said elements further being spaced and parallel with respect to each other to form a planar array, said array being inclined about an axis transverse to the long dimension of said grill elements to conduct liquid toward the lower ends thereof; a collection trough underlying said lower ends of said grill elements to receive the liquid grease emitted therefrom; and, a grease receptacle removably mounted on said container below the level of said trough, said receptacle being open at the top to catch the liquid grease discharged from said trough.

* * * * *